United States Patent Office 2,954,633
Patented Oct. 4, 1960

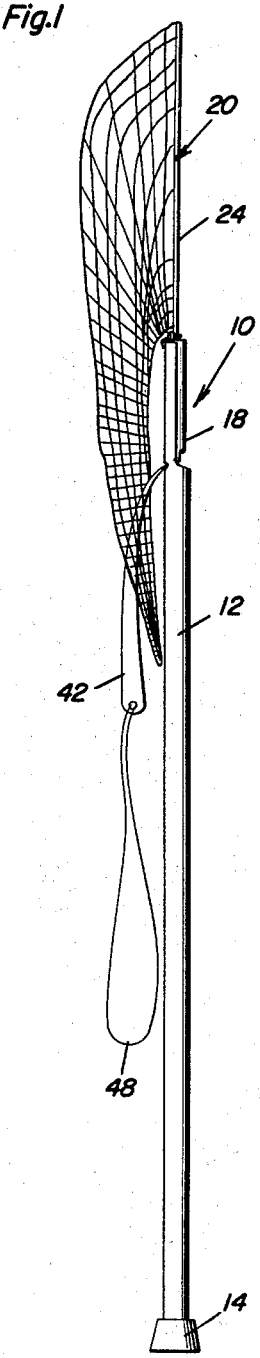
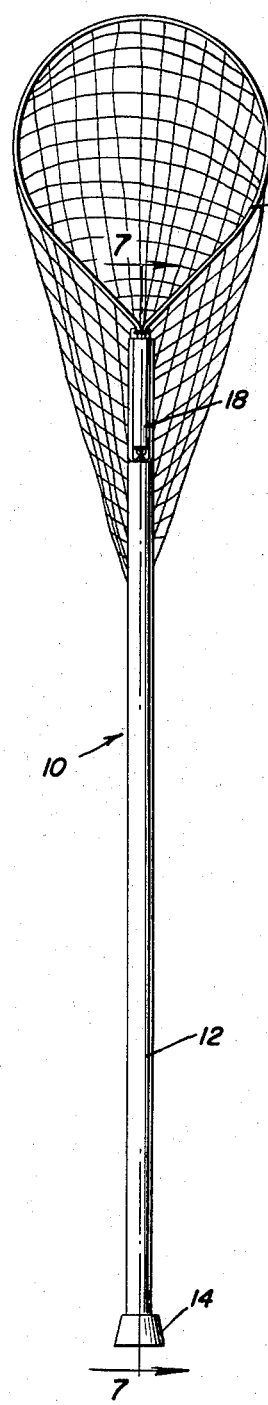
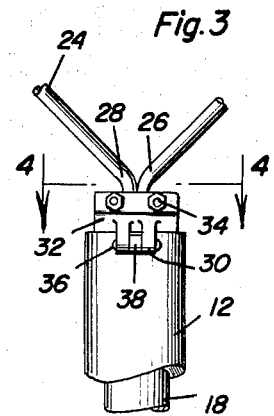
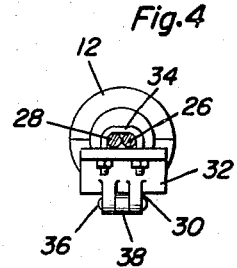
Luther B. Harding
INVENTOR.

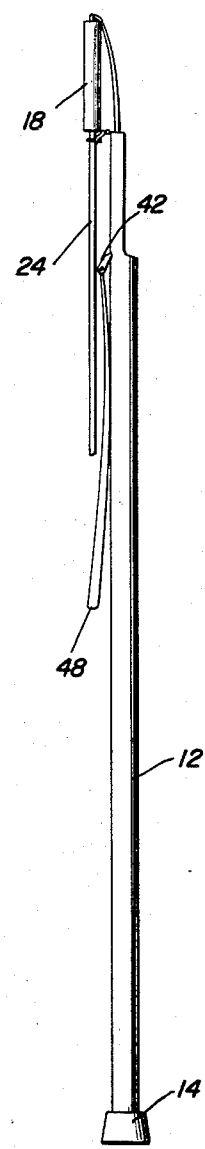
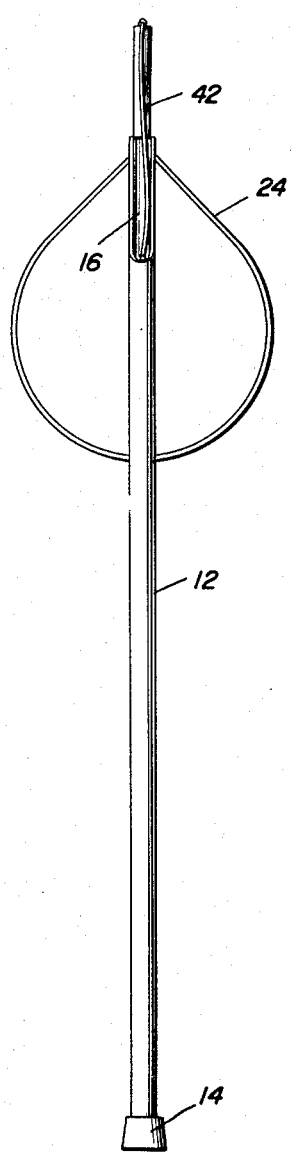
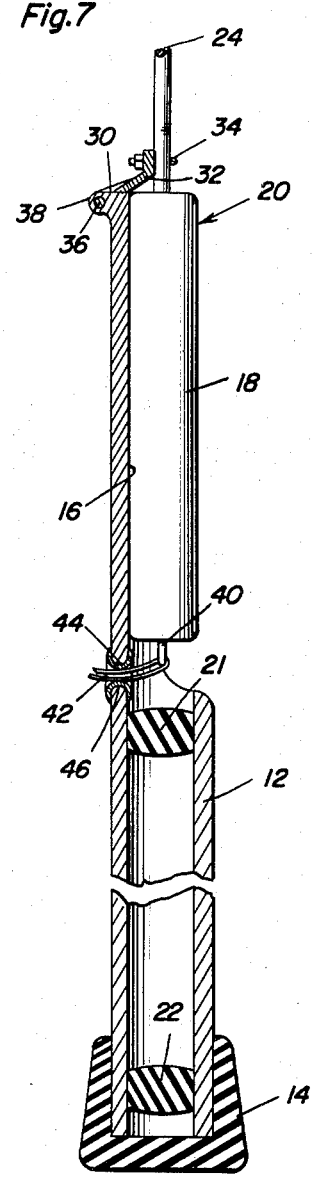

2,954,633

AUTOMATIC FISH NET EXTENDER AND WADING STAFF

Luther B. Harding, 1200 Gaylord St., Denver, Colo.

Filed May 14, 1958, Ser. No. 735,199

2 Claims. (Cl. 43—12)

This invention relates to fishermen's equipment and more particularly to an automatic fish net extender and wading staff.

For the occasional wading or boating fisherman, who wants both a wading staff for safer walking on the stream or lake bottom and also wants a longer handled fish net, there is at present no workable or usable combination of the two appliances, to be easily and quickly attached together and to his body and safely carried, free from snagging grass, brush or limbs and free from sinking or interference with his fishing. The ordinarily used fish dip net, is short handled, with rubber or other stretchable material strap, to go around the shoulders or neck. The shortness thereof and lack of carrying ability does not permit the netting of caught fish, beyond arm's length. This fact "spooks" the caught fish on the netting and loses many, as well as jeopardizing the footing of the fisherman. Likewise, the need of a stabilizing staff to safely feel for the bottom and guide his way on a slippery bottom, is well known to all fishermen who do this type of fishing.

To combine in one unit, the short existing nets, which have some uses even without an extended walking staff with a buoyant, floatable extension walking staff, to extend the net length and make walking the stream bottom safe, all to be easily and safely carried on the body, for automatic extension on netting, folding for carrying and easily detachable, if either unit is not desired, is one of the principal objects of the invention.

The attachment of the two items, without tools, to make one unit, constitutes another object of the invention.

The combination of a staff and a dip net made of lightweight, buoyant material such as aluminum, but not excluding other like materials, bears the weight of the body against slips and against loss thereof, by sinking in the water. The automatic opening of the net to the catch position by simply extending the handle outward toward the water is an important feature of the invention. The folding action of the net to the carrying position by simply pulling the net and folding the net down on its hinge is a further important feature of this invention since it makes the fishing appliance easy to carry and free from snagging.

Another object of this invention is to provide a fisherman's appliance as aforesaid, wherein there is a combination of a dip net having a web in addition to a carrying strap which ordinarily is passed around the neck of the fisherman, in addition to a walking staff on which the dip net support structure is hinged. By a unique arrangement of passing a part of the strap through an opening in the formed end of the walking staff, the previously described functions and operations are easily achieved by a pulling action on the strap that is an automatic result of projecting the combined dip net and staff outwardly from the body when making a catch or when projecting the staff outwardly of the body for any other reason.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side view of the combined walking staff and dip net constructed in accordance with the invention.

Figure 2 is a front view of the appliance in Figure 1.

Figure 3 is an enlarged fragmentary elevational view showing a hinge which constitutes a part of the invention.

Figure 4 is a transverse sectional view taken on the line 4—4 of Figure 3.

Figure 5 is a side elevational view of the appliance in the folded position, the web from the net being removed for clarity.

Figure 6 is a front view of the appliance in Figure 5.

Figure 7 is an enlarged longitudinal sectional view taken on line 7—7 of Figure 2.

In the accompanying drawings there is shown a fisherman's appliance 10 which functions as a dip net and as a walking staff in accordance with the desires of the fisherman. The staff portion is made of an elongate rod 12, preferably hollow and buoyant, and having a substantial rubber or like material foot 14 at one end. This can be in the form of a socket fitted over the end of the elongate rod 12. The opposite end of the elongate rod 12 has a section which constitutes saddle 16 within which the conventional handle 18 of the dip net 20 is disposed when the dip net is in the extended position as shown in Figure 1. As seen in Figure 7 the saddle 16 has a handle 18 nested therein. This figure also shows partitions 21 and 22 in the hollow staff to exclude water from the staff, keeping it buoyant and as light as possible.

Dip net 20 has a frame 24, generally made of wire in loop formation with the ends 26 and 28 close together at the place where they penetrate handle 18. Where the ends 28 and 26 are close to each other, hinge 30 is attached. The hinge is a special one made of a hinge plate 32 with a U-bolt 34 secured to the hinge plate and embracing the ends 26 and 28 of dip net frame 24. Hinge pin 36 is passed through one or more openings in the hinge plate 32 and through one or more openings in a laterally projecting ear 38 at the extremity of the saddle 16. Accordingly, the dip net is mounted for hinged motion at the extremity of the staff and can swing between the fully extended position (Figure 1) with respect to the staff and the retracted position at which the frame of the dip net is approximately parallel to the staff (Figure 5).

The dip net has an eye 40 at its handle 18 and within which an elastic strap 42 is attached. This strap is ordinarily placed around the back and shoulders of the fisherman in the manner previously described. In this invention, the strap is passed through a grommet 44. This grommet lines an opening 46 that is formed in a part of the staff adjacent to the inner extremity of saddle 16. A strap extension, such as cord 48, is attached to the strap 42 and it is this extension which the fisherman will now engage over and around his neck and shoulders.

When the fisherman wishes to use the appliance as a walking staff he may easily do so. When he wishes to use the appliance as a dip net, the staff provides an excellent extender for the handle of the dip net. Moreover the movement of the dip net from the ineffectual position (Figure 5) to the extended position (Figure 1)

is automatic. In carrying the staff, the fisherman need only project the staff outwardly from his body thereby pulling the cord extension 48 which is assumed to be around the back of the neck of the fisherman. The result is that handle 18 is pulled inwardly toward saddle 16 with a hinge movement permitting this relative motion. As a result, the dip net is now automatically ready for use as such.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a combined fish net and wading staff, the combination of a tubular staff member having an end portion open at one side thereof whereby to provide an elongated saddle of an arcuate cross-section, a laterally outwardly projecting lug provided at the outer end of said saddle, a fish net member including a net supporting frame and a handle, said handle being cylindrical with a radius corresponding substantially to the curvature of the arcuate cross-section of said saddle and having a length slightly shorter than the length of the saddle whereby said handle is receivable complementally in the saddle when the fish net member is in its operative position, hinge means provided on said frame adjacent the handle and cooperating with said lug to connect the same to said saddle whereby the fish net member may be swung to an inoperative position with the handle swung outwardly from the saddle, said saddle being provided in its inner end portion with an aperture, a flexible loop member connected to the inner end of said handle and extending outwardly through said aperture for encircling engagement with the body of a user, whereby upon movement of the staff member away from the body of the user said loop member may exert a pulling force on said handle to swing the fish net member from its inoperative to its operative position, said net supporting frame comprising a curved rod having juxtaposed end portions secured in said handle, said hinge means including a plate abutting the end portions of said curved rod, a U-bolt embracing said end portions and securing the same to said plate, a pair of spaced apertured ears provided on said plate and straddling said lug, and a hinge pin extending through said lug and through said ears.

2. The device as defined in claim 1 together with a closure plug provided in said staff member adjacent said saddle and a second closure plug provided in the relatively opposite end of the staff member, whereby to render the same leakproof and buoyant when dropped in water.

References Cited in the file of this patent

UNITED STATES PATENTS

| | | |
|---|---|---|
| 2,292,519 | Hinder | Aug. 11, 1942 |
| 2,645,874 | Collins | July 21, 1953 |
| 2,739,403 | Kalmus | Mar. 27, 1956 |

FOREIGN PATENTS

| | | |
|---|---|---|
| 12,887 | Great Britain | 1896 |